United States Patent
Ashton et al.

(10) Patent No.: US 8,372,509 B2
(45) Date of Patent: Feb. 12, 2013

(54) DECORATIVE LAMINATES INCORPORATING FLAME RETARDANT ENGINEERING THERMOPLASTIC FILMS

(75) Inventors: Henry C. Ashton, Aurora, OH (US);
Christopher T. Hable, Romeo, MI (US);
Robert L. Gray, Hudson, OH (US);
Robert G. Pierson, Akron, OH (US)

(73) Assignee: Schneller, LLC, Kent, OH (US)

( * ) Notice: Subject to any disclaimer, the term of this patent is extended or adjusted under 35 U.S.C. 154(b) by 359 days.

(21) Appl. No.: 12/768,401

(22) Filed: Apr. 27, 2010

(65) Prior Publication Data

US 2010/0272976 A1    Oct. 28, 2010

Related U.S. Application Data

(60) Provisional application No. 61/173,049, filed on Apr. 27, 2009.

(51) Int. Cl.
*B32B 7/02*    (2006.01)

(52) U.S. Cl. ............ 428/212; 428/220; 428/411.1
(58) Field of Classification Search .......... 428/212, 428/411.1, 220
See application file for complete search history.

(56) References Cited

U.S. PATENT DOCUMENTS

| 4,042,561 | A | * | 8/1977 | DeEdwardo et al. | 524/122 |
| 5,398,889 | A | * | 3/1995 | White et al. | 244/119 |
| 7,091,266 | B2 | * | 8/2006 | Murakami et al. | 524/116 |
| 2002/0179271 | A1 | * | 12/2002 | Lindenfelser | 162/281 |
| 2005/0182167 | A1 | * | 8/2005 | Goodson et al. | 524/115 |
| 2006/0189236 | A1 | * | 8/2006 | Davis et al. | 442/136 |

* cited by examiner

*Primary Examiner* — Maria Veronica Ewald
*Assistant Examiner* — Lawrence Ferguson
(74) *Attorney, Agent, or Firm* — James C. Scott; Roetzel & Andress

(57) ABSTRACT

A decorative laminate that contains at least three layers that include a surface layer, a backing layer and a color layer positioned between the surface and backing layers. The surface layer or backing layer or both are made of flame retardant engineering thermoplastic materials.

15 Claims, No Drawings

DECORATIVE LAMINATES INCORPORATING FLAME RETARDANT ENGINEERING THERMOPLASTIC FILMS

RELATED APPLICATIONS

This application claims priority to U.S. Provisional Patent Application No. 61/173,049 filed on Apr. 27, 2009, which is incorporated herein by reference.

FIELD OF THE INVENTION

The present invention relates to multi-layered laminates, more specifically multi-layered laminates including a flame retardant engineering thermoplastic film for use in decorating the interior surfaces of buildings or vehicles for mass transportation such as trains or commercial airliners.

BACKGROUND OF THE INVENTION

Increased fuel economy is becoming increasingly important in all areas of transportation, driving the need for lighter weight designs with the associated difficulties in maintaining or even improving the strength and structural integrity of previous designs. Weight reduction is particularly important in vehicles for mass transportation such as trains and commercial airliners. To maintain, supplement and enhance the strength of light weight panels for flooring and sidewalls of commercial airliners, it is beneficial or even necessary that all components of the assembly contribute to the structural integrity and impact resistance of the final design. Thus, while decorative components used in the interior of an airliner cabin, such as decorative laminates, have typically performed exclusively or primarily an aesthetic role, it is increasingly important that they be designed to maintain, supplement or enhance the strength and durability of the panels and surfaces that they cover. The ability of the decorative laminate to increase strength and durability must be achieved while maintaining strict requirements for flame retardancy in the areas of heat release, smoke generation and emission of potentially harmful products on combustion.

One commercially available product, Aerfilm LHR from Schneller, Inc. is a low-heat-release, low-smoke and low-toxic-gas, engineered thin-film decorative laminate for covering flat and three-dimensional panels. It is relatively lightweight and economical, and provides superior texture retention and stain resistance. It has a typical areal density of 250 g/m$^2$. Typical tear strength is 1.49 N in the machine direction of lamination and 1.65 N in the transverse direction. Typical tensile strength for Aerfilm LHR is 127 N/25 mm in direction of lamination and 124 N/25 mm in the transverse direction. Aerfilm LHR produces a 2 minute total heat release of 43.9 Kw·min/m$^2$, peak heat release rate of 43.2 Kw/m$^2$ and a Ds 4 min of 82.6 when measured according to the ABD0031 in the same manner as Example 1 of the present disclosure.

Another commercially available product, Aertrim LW from Schneller, Inc., is a low heat release, low smoke and low toxic gas decorative laminate that provides enhanced durability. The high stability and durability of this product is attributable to the fact that this product contains a glass reinforced backing layer. Therefore, this product can only maintain two-dimensional formability and is therefore used, for example, in relatively flat laminate panels. The glass backed layer also adds greater weight to the laminate.

SUMMARY OF THE INVENTION

The present invention overcomes problems or limitations in the prior art by disclosing a thermoformable decorative laminate with high, and in some cases, improved tear and tensile strength while maintaining the highest required flame and smoke retardancy standards without substantially increasing the weight or density of the laminate. The decorative laminate consists of a minimum of three layers: (1) a surface layer; (2) a color layer, and (3) a backing layer. In the present invention, the surface layer, the backing layer or both are comprised of flame retardant engineering thermoplastic materials.

DESCRIPTION OF THE DRAWINGS

Detailed Description of Preferred and Alternate Embodiments

The present invention relates to decorative laminates incorporating flame retardant engineering thermoplastic films as either a surface layer, a backing layer or both. The decorative laminate consists of a minimum of three layers: (1) a surface layer; (2) a color layer; (3) a backing layer. Additional layers may be incorporated as needed, for example tie layers to enhance adhesion between the different layers of the laminate or print layers designed to enhance the aesthetic appearance of the laminate. The total thickness of the tie layer and print layer constitute preferably less than 15%, more preferably less than 10% and even more preferably less than 5% of the total thickness of the laminate.

In the present invention, the surface layer, the backing layer or both are comprised of flame retardant engineering thermoplastic materials, including films. The term "engineering thermoplastic materials" is defined by the *Kirk-Othmer Encyclopedia of Chemical Technology* (Volume 10, p. 168, John Wiley & Sons, Inc.) as, "thermoplastic resins, neat or filled, which maintain dimensional stability and most mechanical properties above 100° C. and below 0° C." Engineering thermoplastics are additionally defined as encompassing "plastics that can be formed into parts suitable for bearing loads and able to withstand abuse in thermal environments traditionally tolerated by metals, ceramics, glass and wood" and as "high performance materials that provide a combination of high ratings for mechanical, thermal, electrical, and chemical properties." If used as a surface layer the flame retardant engineering thermoplastic film will typically be a clear, non-pigmented film although the material may be supplied with a matt or other textured finish. Alternatively the material may be supplied with a smooth finish. When used as a surface layer, the engineering thermoplastic film thickness is preferably between 0.0002 and 0.010 in, more preferably between 0.0005 and 0.005 inch. When the engineering thermoplastic film is used as a surface layer, the decorative laminate will display superior abrasion resistance compared to more conventional fluoropolymer surface layers used in decorative laminates for the aerospace industry. The decorative laminate will also display superior impact strengths.

The thermoplastic color layer is typically formed from a solution of polyvinyl chloride with incorporation of appropriate blends of pigment. Additionally, the color layer may contain additional additives such as pigment dispersing aids, heat stabilizers, impact modifiers, rheology modifiers and flame retardant additives. Alternatively, the color layer may consist of an acrylic polymer or other thermoplastic polymer with appropriate pigmentation and additives. Typically the color layer thickness is about 0.004 inches in thickness but may range from 0.002 inch to 0.008 inches or greater.

If the engineering thermoplastic film is employed as the backing layer it is typically pigmented either to a neutral color or to approximately match the color layer. The backing layer material is selected to optimize the flame retardant properties of the laminate, the mechanical properties of the laminate or both. The thickness of the backing layer varies depending on the application requirements of the laminate but preferably is from 0.001 inches to 0.010 inches and more preferably between 0.002 and 0.005 inches. Decorative laminates made with a flame retardant engineering thermoplastic film as the backing layer typically display improvements in tensile strength, tear strength and impact strength relative to conventional backing materials such as PVC or CPVC film.

Preferred thermoplastic engineering films are the flame retardant Lexan FR83, Lexan FR25A and Lexan FR60 polycarbonate copolymer films available from Sabic Innovative Plastics. Films based on polybutylene terphthalate such as Valox FR1, available from Sabic Innovative Plastics, may also be used. Extruded films produced from flame retardant grades of polycarbonate/acrylonitrile butadiene stryrene alloys may also be used. Suitable grades of flame retardant PC/ABS resins are available from Sabic Innovative Plastics under the trade name Cycoloy. Particularly preferred are extruded films of a polycarbonate terpolymer supplied as Lexan FST9705 resin or supplied in sheet or film form as Lexan XHR, also available from Sabic innovative Plastics.

Decorative laminates according to the invention will have very good flame retardant properties as measured by the Ohio State University (OSU) heat release test and the NBS smoke tests. The OSU heat release test, sometimes referred to as the OSU rating, measures the amount of energy released after 2 minutes and the peak heat release energy. Decorative laminates according to the invention will, upon ignition, also have lower emission of potentially toxic gases. For example a clear Lexan XHR film will have lower emission of HF compared to a similar laminate employing a fluoropolymer surface layer. When white Lexan XHR film is used as a backing layer, the decorative laminate will, upon ignition, have lower emission of HCl compared to use of standard backing materials such as PVC or CPVC.

Production of the Decorative Laminate

Manufacture of the decorative laminate may be achieved in either a continuous process to produce rolls of up to 250 yards or greater in length or in a batch or semi-continuous press process to produce sheets. In a continuous process the color layer or layers are first coated from solution onto a release paper or other carrier medium followed by solvent removal in an oven. Suitable coating methods includes reverse roll, knife over roll, or slot die coating. The color layer is then laminated onto the surface layer at temperatures and pressures appropriate for the materials being employed. For good adhesion the laminate must be heated above the melting or softening point of at least one of the component layers. Single or multiple print layers may be applied to the back side of the clear surface layer prior to lamination to the color layer. Alternatively, a print layer may be applied directly to the color layer or printed on to a release paper or other suitable carrier and transfer laminated to the color layer before lamination to the surface layer.

The backing layer is then laminated to the back side of the color layer. For good adhesion between layers the laminate must be heated above the melting or softening point of at least one of the layers. Adhesion can be facilitated with a primer layer typically less than 0.0001 to 0.0002 thick.

A surface texture may be imparted into the surface of the decorative laminate by heating the laminate to near or slightly above the softening point of the surface layer. When clear Lexan FR60 or clear Lexan XHR films are employed as surface layers the surface of the laminate should be heated to near or above 350° F. This ensures good flow of the surface layer material during texture formation and reduces residual stresses in the surface layer. This will minimize loss of texture if the material is to be heated and formed in a subsequent forming step.

In the press process the color layer is coated onto release paper followed by solvent removal. The layers of the laminate are assembled on a metal plate covered with a layer of release paper or release film. The thermoplastic backing layer is typically placed as the bottom layer of the construction although an optional adhesive film layer may be placed beneath the backing layer if required for installation. The color layer or layers are removed from release paper and placed on top of the backing layer and if a print layer is coated onto a color layer it is placed with print layer facing up. The clear surface layer is placed on top of the print layer. A release film is then placed over the surface layer and a texture plate formed from metal or epoxy prepreg or other texture medium such as a fabric or texture paper is place on top of the release film. Finally, a second metal plate is placed on top of the texture plate. The assembly is then placed between the platens of a heated press at sufficient temperature and pressure and for sufficient time to consolidate the layers of the construction and impart the texture onto the surface layer. For the Lexan polycarbonate films, press temperatures of near or slightly above 300° F. and pressures near or slightly above 150 psi produce laminates with good adhesion between surface layers and good texture retention in subsequent operations.

It may be advantageous in certain situations to employ a combination of continuous lamination steps where some or all of the layers are laminated in a continuous process followed by final assembly, consolidation and texturing in a press step. For example, pre-laminating the clear surface layer to a color layer in a continuous process can eliminate or reduce the risk of trapping dust or other airborne particles between the clear surface and color layer.

Use of the Decorative Laminate

The decorative laminate of the invention may be used to decorate the interior surfaces of buildings or vehicles for mass transportation such as trains or commercial airliners. For example the material may be applied to a phenolic resin impregnated fiberglass or Nomex honeycomb panel substrate as is used in the interior of a commercial airliner. If the laminate is supplied with pressure sensitive adhesive, the laminate may be applied to the substrate with hand pressure or a roller and heat may be applied to facilitate stretching and forming over edges, corners and other three-dimensional features in the surface to be covered. Alternatively, contact adhesive may be used to apply the laminate to a surface.

Alternatively the decorative panel may be formed over a 3 dimensional substrate, for example the back of a seat or the door an aircraft luggage bin. Typically the decorative laminate would be heated and thermoformed or vacuum laminated over the 3 dimensional object. If the laminate is provided with a heat activated adhesive layer on this back the heat of the thermoforming process would also activate the adhesive, ensuring a durable bond between the decorative laminate and the substrate.

The following examples of alternate embodiments of decorative laminates constructed in accordance with the present invention are provided as further disclosure of exemplary embodiments and do not otherwise limit the scope of the invention.

Example 1

Color layer was coated from a solution formulated with solution-grade PVC in MEK onto release paper on a reverse roll coater. A 4 mil layer was sequentially laminated to a clear fluoropolymer layer on a polyester carrier in a continuous lamination process. In a final lamination step 2 mil extruded film produced from Lexan FST9705 resin was laminated to the vinyl embossing resin. Material was embossed with various textures in a heated press at sufficient heat and pressure to induce a permanent texture on the laminate. The resulting laminate had an areal density of 245 g/m². The resulting laminates had an average tear strength of 1.65 N in the machine direct (direction of the continuous lamination) and 1.77 N in the cross machine direction when tested according to ISO 4674 method A2 at a test speed of 100 mm/min. The laminate produced a tensile strength of 196 N/25 mm of width in the machine direction and 203 N/25 mm in the cross machine direction when tested according to ISO 527-3 with a type 2 specimen at a test speed of 50 mm/min. Flame resistance properties were measured according to FAR 25.853 Appendix F, Parts IV and V, with the laminates bonded to a standard crush core phenolic panel (available from Schneller, LLC) using a 2 mil layer of flame retardant heat activated adhesive. The material produced a 2 minute total heat release of 35.7 Kw·min/m² and a peak heat release rate of 40.4 Kw/m². Flaming smoke measurements produced a smoke density of at 4 min (Ds 4 min) of 98.1.

Example 2

Vinyl color layer was laminated to a fluoropolymer layer in the manner of example 1. A 4 mil film produced from Lexan FST9705 resin was laminated to the color layer. A textured surface was imparted into the material in a continuous process using strip and roll heaters preheat the material to soften the laminate and application pressure from textured roll. The resulting laminate had an areal density of 323 g/m². Tear strength for this laminate was 2.04 N in the machine direction of the lamination and 2.50 N in the cross machine direction. Tensile strength was 256 N/25 mm in the machine direction and 218 N/25 mm in the cross machine direction. The 2 minute total heat release was 53.9 Kw·min/m², peak heat release rate was 48.0 Kw/m² and Ds 4 min was 89.9 when measure according to the FAR 25.853 test methods in the same manner as Example 1. Measurement of gas release from the laminate, also bonded to standard crush core phenolic panel, according to the Airbus Industrie Test Method AITM 3.0005 produced values of 2 ppm for HCN, 100 ppm for CO, 9 ppm of NO/NO₂, 0 ppm of SO₂/H₂S, 20 ppm for HF and 12.5 pm for HCl.

Example 3

A layer of fluoropolymer, a 4 mil vinyl color layer and a 5 mil layer of film produced from Lexan FST9705 resin were laid up with an epoxy texture plate or a texture paper on the fluoropolymer face. A thin layer, ca. 0.2 mil, of an acrylic primer was used between the vinyl resin and the Lexan film. The laminate was consolidated and texture in one step in a heated press at 300-350° F. and 125-200 psi. The resulting laminate had an areal density of 391 g/m², a tear strength of 2.57 N and a tensile strength of 347 N/25 mm. The laminate gave average 2 minute total heat release of 43.6 Kw·min/m², a peak heat release rate of 40.5 Kw/m² and a Ds 4 min of 137 when evaluated according to the methods of Example 1.

Example 4

Materials were processed similar to the laminates of example 3 using a 10 mil film of extruded Lexan FST9705 resin. The resulting laminate had an areal density of 525 g/m². The laminate gave average 2 minute total heat release of 48.6 Kw·min/m², a peak heat release rate of 43.7 Kw/m² and a Ds 4 min of 194 when evaluated according to the methods of Example 1.

Example 5

A decorative laminate was made according to the method in Example 3 using a 3 mil film of Lexan FR83 as the backing layer. The material was consolidated in a press at 300° F. and 200 psi. The resulting laminate gave a tear strength of 2.84 N and a tensile strength of 249 N/25 mm. The laminate gave an average 2 minute total heat release of 47.5 Kw*min/m², a peak heat release rate of 54.3 Kw/m² and a Ds 4 min of 146. Measurement of gas release produced values of 40 ppm for HCl and 36 ppm for HF when evaluated according to the methods of Examples 1 and 2.

Example 6

A 3 mil film of a flame retardant Cycoloy resin was supplied by Sabic Innovative Plastics. The material was used in a backing layer constructed according to the method in Example 3. No acrylic primer was used in the construction. The resulting laminate had an areal density of 312 g/m². The resulting laminate had a tensile strength of 222 N/25 mm. The laminate gave average 2 minute total heat release of 56.4 Kw*min/m², a peak heat release rate of 51.9 Kw/m² and a Ds 4 min of 132 when evaluated according to the methods of Example 1.

Example 7

A 5 mil film of Valox FR1 based on PBT resin was obtained from Sabic Innovative Plastics. The material was used as a backing layer in a decorative laminate constructed according to the method in Example 3 without the use of a primer layer. The laminate was consolidated at a temperature of 350° F. and 200 psi. The resulting laminate had a tear strength of 4.85 N and a tensile strength of 207 N/25 mm. The laminate gave average 2 minute total heat release of 64.3 Kw*min/m², a peak heat release rate of 60.4 Kw/m² and a Ds 4 min of 153 when evaluated according to the methods of Example 1.

Example 8

A 10 mil film of Lexan FR60 was obtained from Sabic Innovative Plastics. The material was used as a backing layer in a decorative laminate constructed according to the method in Example 3. The laminate gave average 2 minute total heat release of 56.2 Kw*min/m², a peak heat release rate of 44.7 Kw/m² and a Ds 4 min of 185 when evaluated according to the methods of Example 1.

Example 9

A 5 mil thick clear film produced from Lexan FST 9705 was laid up with a 4 mil vinyl color layer and a 2 mil layer of pigmented polyvinyl fluoride (PVF). Thin layers of acrylic primer, ca 0.2 mil, were placed between the embossing resin and the PVF and the embossing resin and the Lexan film. An epoxy texture plate was used to impart texture to the clear Lexan layer and the laminate was consolidated in a heated press at 300° F. and 150 psi. The resulting laminate had an areal density of 443 g/m² tear strength of 4.15 N. The laminate gave average 2 minute total heat release of 44.9 Kw·min/m², a peak heat release rate of 39.7 Kw/m² and a Ds 4 min of 181 when evaluated according to the methods of Example 1.

Example 10

A layer of fluoropolymer, a 4 mil vinyl color layer, a 2 mil layer of film produced from Lexan FST9705 resin, and a 1 mil PVF backing layer were laid up with a texture paper on the fluoropolymer face. A thin layer, ca. 0.2 mil, of an acrylic primer was used between the PVF resin and the Lexan film. The laminate was consolidated and texture in one step in a heated press at 310° F. and 150 psi. The resulting laminate had an areal density of 296 g/m², a tear strength of 1.96 N and a tensile strength of 238 N/25 mm. The laminate gave average 2 minute total heat release of 51.3 Kw·min/m², a peak heat release rate of 44.6 Kw/m² and a Ds 4 min of 116 when evaluated according to the methods of Example 1. The PVF film on the back layer improves the hot strength of the laminate, allowing improved hand application of the laminate on exposed edges of a panel.

Example 11

A layer of fluoropolymer, a 4 mil vinyl color layer, a 2 mil layer of film produced from Lexan FST9705 resin, and a 2 mil PVF backing layer were laid up with a texture paper on the fluoropolymer face. A thin layer, ca. 0.2 mil, of an acrylic primer was used between the PVF resin and the Lexan film. The laminate was consolidated and texture in one step in a heated press at 310° F. and 150 psi. The resulting laminate had an areal density of 336 g/m², a tear strength of 2.64 N and a tensile strength of 249 N/25 mm. The laminate gave average 2 minute total heat release of 49.1 Kw·min/m², a peak heat release rate of 50.4 Kw/m² and a Ds 4 min of 128 when evaluated according to the methods of Example 1. The PVF film on the back layer improves the hot strength of the laminate, allowing improved hand application of the laminate on exposed edges of a panel.

The disclosure and related inventions thus provide novel laminate structures with highly advantageous formation and physical properties, including flame retardancy and resistance to flammability and heat and smoke release, and reduced thicknesses and weights for transportation vehicle applications.

What is claimed is:

1. A thermoformable decorative laminate comprising:
   a fluoropolymer layer with a thickness in the range of approximately 0.0002-0.005 inches;
   a color layer with a total thickness in the range of approximately 0.002-0.008 inches;
   a layer of film produced from Lexan FST9705 resin with a thickness in the range of approximately 0.001-0.010 inches;
   an acrylic primer layer with a thickness that is less than 0.0002 inches; and
   a polyvinyl fluoride (PVF) layer with a thickness in the range of approximately 0.0005-0.004.

2. The thermoformable decorative laminate of claim 1, wherein the total and peak heat release, as measured by the OSU heat release test, is less than 65 Kw*min/m² and 65 Kw/m² respectively and the measurement of smoke release according to the FAR 25.853, Appendix F, Parts IV and V is less than 200.

3. The thermoformable decorative laminate of claim 1, wherein the total and peak heat release, as measured by the OSU heat release test, is less than 55 Kw*min/m² and 55 Kw/m² respectively, the measurement of smoke release according to the FAR 25.853, Appendix F, Parts IV and V is less than 150, and the concentration of HF does not exceed 100 ppm, HCl does not exceed 150 ppm, HCN does not exceed 150 ppm, $SO_2$ does not exceed 100 ppm, $NO/NO_2$ does not exceed 100 ppm and the CO does not exceed 1000 ppm when tested according to AITM 3.0005.

4. The thermoformable decorative laminate of claim 1, wherein the tear strength is at least 1.5 N and the tensile strength is at least 175 N/25 mm.

5. The thermoformable decorative laminate of claim 1, wherein the tear strength is at least 2 N and the tensile strength is at least 200 N/25 mm.

6. The thermoformable decorative laminate of claim 1, wherein the tear strength is at least 2.5 N and the tensile strength is at least 250 N/25 mm.

7. A thermoformable decorative laminate comprising:
   a fluoropolymer layer with a thickness in the range of approximately 0.0002-0.005 inches;
   a color layer with a total thickness in the range of approximately 0.002-0.008 inches;
   a layer of film with a thickness in the range of approximately 0.001-0.010 inches, which is selected from the list of: Lexan FR83, Lexan FR25A, Lexan FR60, Lexan FST9705 and Lexan XHR;
   an acrylic primer layer with a thickness that is less than 0.0002 inches; and
   a polyvinyl fluoride (PVF) layer with a thickness in the range of approximately 0.0005-0.004.

8. The thermoformable decorative laminate of claim 7, wherein the total and peak heat release, as measured by the OSU heat release test, is less than 65 Kw*min/m² and 65 Kw/m² respectively and the measurement of smoke release according to the FAR 25.853, Appendix F, Parts IV and V is less than 200.

9. The thermoformable decorative laminate of claim 7, wherein the total and peak heat release, as measured by the OSU heat release test, is less than 55 Kw*min/m² and 55 Kw/m² respectively, the measurement of smoke release according to the FAR 25.853, Appendix F, Parts IV and V is less than 150, and the concentration of HF does not exceed 100 ppm, HCl does not exceed 150 ppm, HCN does not exceed 150 ppm, $SO_2$ does not exceed 100 ppm, $NO/NO_2$ does not exceed 100 ppm and the CO does not exceed 1000 ppm when tested according to AITM 3.0005.

10. The thermoformable decorative laminate of claim 7, wherein the tear strength is at least 1.5 N and the tensile strength is at least 175 N/25 mm.

11. The thermoformable decorative laminate of claim 7, wherein the tear strength is at least 2 N and the tensile strength is at least 200 N/25 mm.

12. The thermoformable decorative laminate of claim 7, wherein the tear strength is at least 2.5 N and the tensile strength is at least 250 N/25 mm.

13. A thermoformable decorative laminate comprising:
   a fluoropolymer layer with a thickness in the range of approximately 0.0002-0.005 inches;
   a color layer with a total thickness in the range of approximately 0.002-0.008 inches;
   a layer of film which is a polycarbonate, homopolymer, copolymer or terpolymer with a thickness in the range of approximately 0.001-0.010 inches;
   an acrylic primer layer with a thickness that is less than 0.0002 inches; and a polyvinyl fluoride (PVF) layer with a thickness in the range of approximately 0.0005-0.004.

14. The thermoformable decorative laminate of claim 13, wherein the layer of film is polybutylene terephthalate (PBT) based.

15. The thermoformable decorative laminate of claim 13, wherein the layer of film is a polycarbonate/acrylonitrile butadiene styrene (ABS) blend.

* * * * *